June 21, 1932.  D. MAZZIE  1,864,455
THERMOSTATIC CONTROL APPARATUS
Filed March 18, 1931  2 Sheets-Sheet 1

INVENTOR.
Dominic Mazzie
BY Lancaster, Allwine and Rommel
ATTORNEYS.

June 21, 1932. D. MAZZIE 1,864,455

THERMOSTATIC CONTROL APPARATUS

Filed March 18, 1931 2 Sheets-Sheet 2

INVENTOR.
Dominic Mazzie

BY Lancaster, Allwine and Rommel
ATTORNEYS.

Patented June 21, 1932

1,864,455

UNITED STATES PATENT OFFICE

DOMINIC MAZZIE, OF EAST HARTFORD, CONNECTICUT

THERMOSTATIC CONTROL APPARATUS

Application filed March 18, 1931. Serial No. 523,594.

The present invention relates to circuit closing devices and the primary object of the invention is to provide a thermostatic control device embodying a fluid contact tube for direct control of the line circuit.

A further object of the invention is to provide an improved indicating thermostat whereby the temperature of ovens and the like may be controlled without the employment of relays acting to control the load and thereby materially reducing the cost of automatic oven control devices.

A further object resides in the novel arrangement whereby the contact tube is tilted for breaking an electric circuit upon predetermined degrees of heat.

A further object resides in the novel arrangement whereby the contact tube is angularly adjusted for breaking the electric circuit at various degrees of heat.

A further object of the invention resides in the novel arrangement whereby the setting of the contact tube is accomplished thru varying the relationship of the contact tube with a thermally actuated cam.

Other objects and advantages of the invention will be apparent during the course of the following detailed description, taken in connection with the accompanying drawings forming a part of this specification and in which drawings:—

Figure 1:
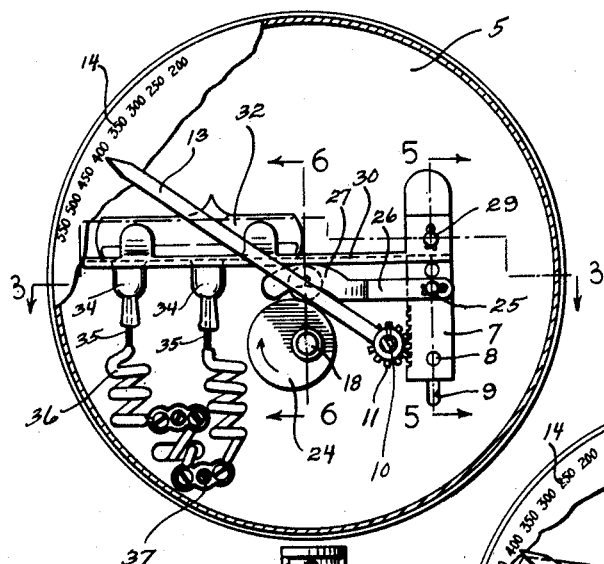
Figure 1 is a face plan view of the thermostatic control apparatus showing a portion of the cover broken away and the apparatus in a circuit closing position with the indicator set for breaking the circuit at a temperature of 400° F.
Figure 7:
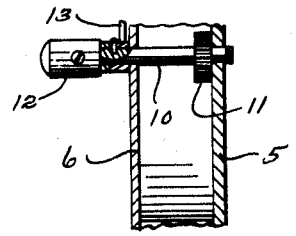
Figure 7 is a fragmentary detail section on the line 7—7 of Figure 3.
Figure 2:
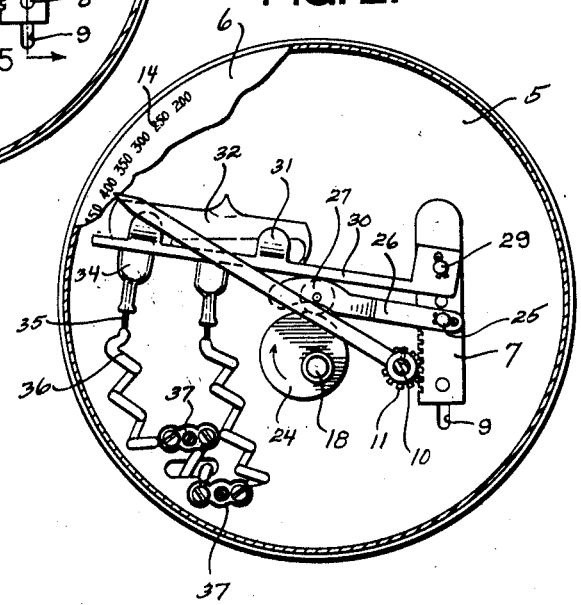
Figure 2 is a view similar to Figure 1 but showing the contact tube tilted for breaking the circuit.

Referring to the drawings in detail, and particularly to the form of invention disclosed in Figures 1 to 7 inclusive, the thermostatic circuit controlling device comprises a disc-shaped base or mounting plate 5 which may be provided with an internally threaded peripheral flange for threaded reception of a cup-shaped cover 6. The base 5 and cover 6 provide a closed casing for the circuit controlling apparatus.

Mounted for vertical sliding movement upon the base 5 is a rack 7 and this rack is preferably mounted for vertical sliding movement by means of suitable cap screws 8 operating in a vertically disposed slot 9 provided in the base 5. The cap screws 8 serve to retain the rack in a vertical position. Rotatably journaled in the base 5 and front wall of the cover 6 at the toothed side of the rack 7 is a shaft 10 having fixed thereon a pinion 11 for meshing with the rack 7. The outer or forward end of the shaft 10 is provided with a suitable knob 12 and between the knob and cover 6 is a pointer 13 for movement along a heat indicating scale 14 delineated in any preferred manner upon the face of the cover 6 on an arc concentric to the axis of the shaft 10. Rotation of the shaft 10 by the setting knob 12 imparts vertical sliding movement to the rack 7 and also moves the pointer 13 along the scale 14.

Figure 3:
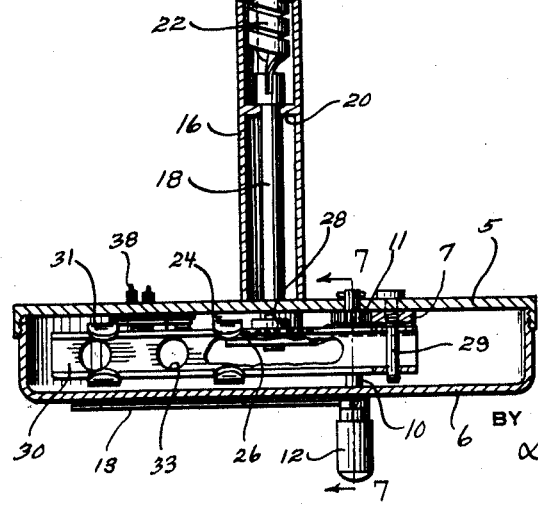
Figure 3 is a view substantially on the line 3—3 of Figure 1.
Figure 4:
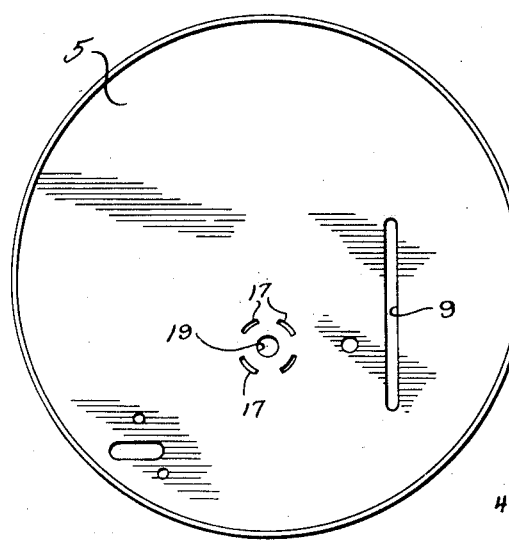
Figure 4 is a face plan view of the base or mounting plate for the control apparatus.
Figures 5, 6:
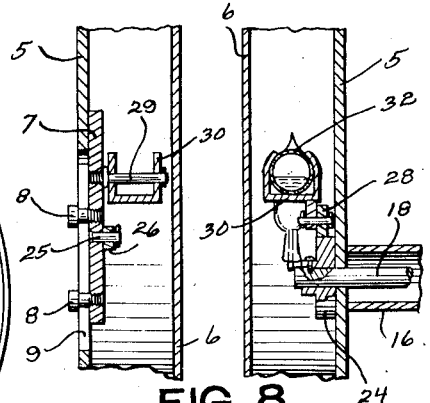
Figures 5 and 6 are fragmentary sections on the respective lines in Figure 1.

Mounted at one end upon the base plate 5 is a thermostatic unit 15 embodying a tubular holder 16 adapted to have its forward end anchored in arcuate slots 17 provided in the base plate at one side of the slot 9. The tubular holder 16 is anchored against rotation and extends rearwardly at a right angle to the plane of the base plate. Rotatably supported axially in the forward portion of the tubular holder 16 is a spindle 18 the forward end of which extends thru a bearing opening 19 provided in the base plate 5 axially of the circular series of slots 17. The rear end portion of the spindle 18 is rotatably supported in a bearing 20 and rearwardly of the bearing the spindle is preferably enlarged as shown in Figure 3. Closing the inner or rear end of the holder 16 is a plug 21 and this plug may be secured against rotation in any preferred manner. Arranged between the bearing 20 and plug 21 is a thermal element 22 in the form of a helical coil having one end anchored to the fixed plug 21 and its opposite end secured to the inner end of the rotating spindle 18. The tubular holder 16 may be slotted longitudinally as at 23 to permit ready passage of heat to the thermal element 22. When heat is applied to the element 22, the same will have a tendency to coil and impart a rotating movement to the spindle 18.

Affixed to the forward end of the spindle 18 at the front of the base plate 5 is a cam 24 adapted to be rotated through the action of the element 22. The cam 24 is preferably capable of being adjusted about the spindle 18 for initial setting of the cam.

Pivotally mounted at one end as upon a pivot pin 25 carried by the rack 7 is an arm 26 formed at its free end with an upwardly arched arcuate-shaped rest portion 27. Rotatably supported by the rest portion 27 is a cam engaging roller 28 adapted to have rolling contact with the cam 24.

Pivotally mounted at one end as upon a pivot pin 29 carried by the rack 7 at a location above the pivot pin 25, is a supporting arm or bracket 30 adapted to rest upon the arcuate portion 27 of the setting arm 26. The free end of the supporting arm 30 is formed with suitable upturned clips 31 for supporting a mercury contact tube 32 at a location on the arm beyond its contact with the roller 28. With this arrangement, the weight of the mercury contact tube 32 serves to retain the bracket arm 30 in contact with the roller 28 and the roller in contact with the cam 24.

The pivoted supporting arm 30 is provided adjacent its outer or free end with a pair of spaced apart openings 33 into which are fitted the wells or pockets 34 formed in the contact tube 32. These depending wells 34 serve to prevent rotation of the contact tube and as will be observed, one of the wells is formed substantially midway the ends of the tube while the other well is formed closely adjacent one end of the tube. Extending into each of the wells 34 is a contact pin 35 and these spaced apart contact pins are bridged by the mercury in the tube for completing an electric circuit. Connected with each of the contact pins 35 is a yieldable conductor 36 and these conductors are connected to suitable terminals 37 secured to the base plate 5. The terminals 37 provide means whereby conductors 38 may be connected in circuit with the control apparatus. The conductors 38 may connect suitable heating elements to be controlled by the apparatus.

As to the mode of operation, it will be noted in Figure 1 that when the pointer 13 is at a position substantially midway the scale 14 that the contact tube 32 is supported in a horizontal position with the mercury in the tube bridging the contact pins 35. Figure 1 also shows the cam 24 in its normal position when no heat is applied to the thermal element 22. When a suitable control switch is closed for completing a circuit thru the line 38 and to the heating element with which the thermostatic unit 15 is associated, the thermal element 22 will be acted upon by the heat and caused to coil and impart rotation to the cam 24 in the direction of the arrow in Figures 1 and 2. This direction of rotation of the cam causes the high or throw side of the cam to move toward the contacting roller 28 and so tilt the supporting arm 30 as to break the mercury contact between the pins 35. Cooling of the element 22 will cause the cam 24 to rotate in a counter clockwise direction and so lower the arm 30 as to allow the mercury to again bridge the contact pins 35 and complete the circuit to the heating element.

When a lower degree of heat is desired the setting knob 12 is rotated in a clockwise direction moving the pointer 13 upwardly along the scale 14. This direction of rotation of the knob 12 imparts rotation to the pinion 11 and lowers the rack 7 in the guide slot 9. This lowering of the rack 7 lowers the pivot pins 25 and 29 and causes a slight tilting of the tube 32. This tilting of the contact tube is not sufficient to break the mercury bridge between the contact pins 35 but disposes the tube in such a position that only a slight rotation of the cam 24 is required for further tilting the tube to a point whereby the mercury bridge will be broken. This lowering of the rack 7 by the setting means varies the position of the pivots 25 and 29 with respect to the cam 24. This lowering of the rack also varies the relationship of the contact tube to the cam and changes slightly, the point of contact of the roller 28 with respect to the throw of the cam.

If a higher degree than that indicated in Figure 1 is desired, the setting knob 12 is rotated in a counter clockwise direction moving the pointer 13 downwardly along the scale and thru the pinion 11 causes the rack 7 to be raised in the guide slot 9. This raising of the rack lowers the outer or free end of the supporting arm 30 and so tilts the contact tube as to require considerable rotation of the cam 24 for breaking the electric circuit. With the supporting arm inclined downwardly from the pivot 29, the cam is required to first raise the arm to a horizontal position and then tilt the arm upwardly before the mercury bridge is broken. Thus it will be seen that setting of the apparatus to any desired degree of heat acts to vary the relationship of the contact tube with respect to the cam.

Figure 10:
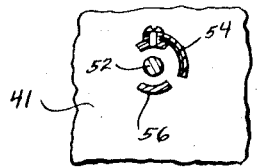
Figure 10 is a detail section on the line 10—10 of Figure 9.
Figure 8:
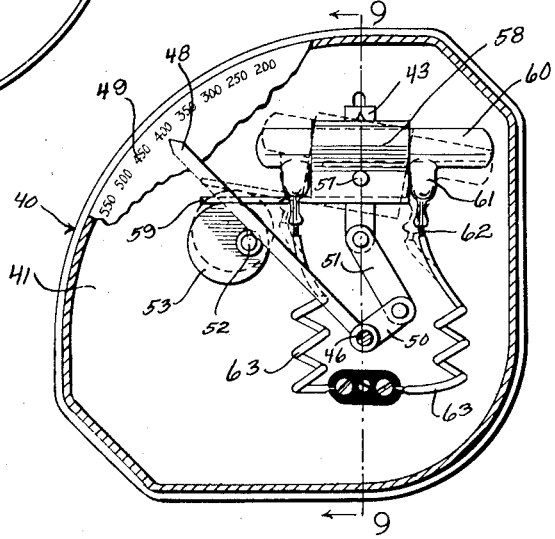
Figure 8 is a plan view of a modified form of thermostatic control device.
Figure 9:
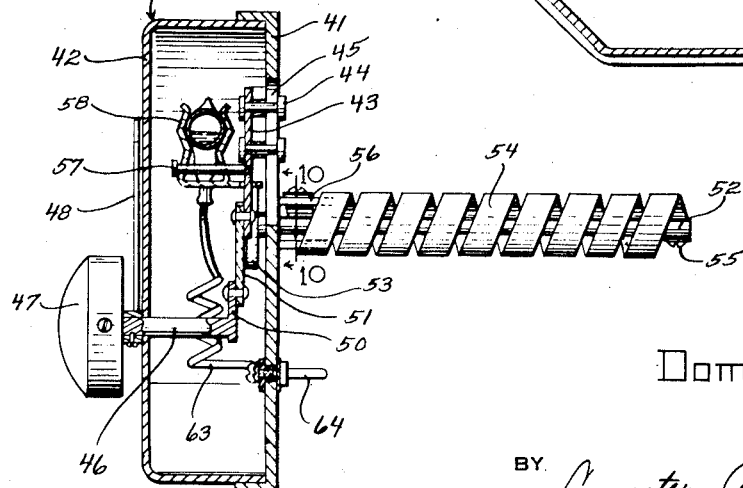
Figure 9 is a section on the line 9—9 of Figure 8.

Referring now to the form of control apparatus disclosed in Figures 8, 9 and 10, the device comprises a casing 40 embodying a quadrant-shaped base or mounting plate 41 and a removable cover 42 interfitting in a marginal flange provided about the edge of the base plate 41. Mounted for vertical sliding movement in the base plate 41 is a vertically disposed setting bar 43 provided with guide pins 44 fitting in a vertically disposed slot 45 formed vertically in the base plate. Rotatably mounted in the cover 42 below the slot 45 is a setting shaft 46 carrying a knob 47 whereby the shaft may be manually rotated for setting the apparatus for any desired degree of heat. Secured to the shaft 46 at the outer side of the cover 42 is a suitable pointer 48 for co-acting with a scale 49 delineated upon the face side of the cover on an arc concentric to the axis of the shaft 46. Provided on the inner end of the shaft 46 is a crank arm 50 to which is pivotally connected one end of a link 51, the opposite end of the link having pivotal connection with the lower end of the setting bar 43. By observing Figure 8 it will be seen that upon rotation of the shaft 46 by the knob 57 that vertical sliding movement may be imparted to the setting bar 43 as the pointer 48 is moved along the scale 49.

Rotatably mounted in the base plate 41 at one end side of the slot 45 is a spindle 52 having mounted upon its forward end a cam 53. Encircling the spindle 52 at the rear of the base plate 41 is a thermal element 54 in the form of a helical coil and having its rear end secured as at 55 to the rear end of the spindle. The forward end of the element 54 is extended about and secured to suitable arms 56 attached to the base plate 41.

Pivotally mounted adjacent one end upon the setting bar 43 as by means of the pivot pin 57 is a bracket 58 having an arm 59 resting freely upon the cam 53. Supported in the bracket 58 in parallel relation to the arm 59 is a mercury contact tube 60 formed with the depending wells 61 in which are arranged the contact pins 62. Connected with each of the contact pins 62 is a flexible conductor 63 the lower ends of which are connected to suitable contacts 64 for connection in the line to be controlled by the apparatus.

In operation of the control device shown in Figures 8, 9 and 10, movement of the pointer 48 upwardly or toward the low end of the scale 49 lowers the setting bar 43 in the slot 45. Lowering of the bar 43 causes tilting of the contact tube 60 for varying the relation of the pivot pin 57 with respect to the point of contact of the arm 59 with the cam 53.

In both forms of the invention it will be seen that the contact tubes are mounted upon pivoted brackets and that the setting means acts to vary the relationship of the brackets with respect to the thermally operated cams.

Thus it will be seen that an improved type of indicating thermostatic control device has been provided embodying a thermally operated cam with which the fluid contact tube is associated in such manner as to permit ready varying of the relationship of the tubes to the cam for setting the tube at various operating positions.

Changes in detail may be made to the forms of invention herein shown and described, without departing from the spirit of the invention or the scope of the following claims.

I claim:

1. In a thermostatic circuit controller, the combination of a fluid contact tube, a thermally operated cam, means supporting said tube and supported by said cam to tilt the tube upon movement of the cam, and means to vary the relationship of said last mentioned means with respect to the cam, to change the point of contact toward and from the throw of the cam.

2. In a thermostatic circuit controller, the combination of a fluid contact tube, a thermally operated cam, pivoted supporting means for the tube and supported by the cam to tilt the tube upon movement of the cam, and setting means for varying the relationship of the supporting means with respect to the cam.

3. In a thermostatic circuit controller, the combination of a fluid contact tube, a thermally operated cam, a bracket pivoted at an end thereof supporting the tube and supported at its other end at a point on the cam to be tilted upon movement of the cam, and setting means for varying the relationship of the pivotal mounting of the bracket with respect to the cam.

4. In a thermostatic circuit controller, the combination of a pivotally mounted fluid contact tube, a thermally operated cam for tilting the tube upon movement of the cam, and setting means operable for varying the relative positions of the pivots of the tube and the cam.

5. In a thermostatic circuit controller, the combination of a fluid contact tube, a thermally operated cam, pivoted supporting means for the tube and contacting the cam to tilt the tube upon movement of the cam, and setting means for varying the position of the pivotal axis of the supporting means with respect to the cam.

6. In a thermostatic circuit controller, the combination of a thermally operated cam, a bar vertically guided at one side of the cam, a bracket pivoted on the bar to be tilted upon movement of the cam, a fluid contact tube fixed on the bracket, and means for moving the bar vertically for varying the relation of the pivot of the bracket with respect to the cam.

7. In a thermostatic circuit controller, the combination of a thermally operated cam, a bar vertically guided at one side of the cam, a bracket pivoted on the bar to be tilted upon movement of the cam, a fluid contact tube mounted on the bracket and setting means for vertically moving the bar and embodying an indicator arm movable upon movement of the bracket supporting bar.

8. In a thermostatic circuit controller, the combination of a casing including a base plate, a bar vertically guided on the base plate, a thermally operated cam, a bracket pivotally carried by the bar to be tilted by movement of the cam, a fluid contact tube fixed on the bracket, and indicating setting means for vertically adjusting said bar.

9. In a thermostatic circuit controller, a pivoted mounting, a fluid contact tube mounted thereon, a thermally operated cam, a pivoted setting arm contacting with the cam and supporting the pivoted mounting, and means for varying the relationship of the pivot for the arm and contact tube with respect to the cam.

10. In a thermostatic circuit controller, the combination of a casing including a base plate, a setting bar vertically guided on the base plate, a thermally operated cam, a setting arm pivotally carried by the bar and supported at its free end on the cam, a bracket pivotally carried by the bar and resting upon the setting arm, a fluid contact tube carried by the bracket, and setting means for vertically adjusting said bar.

11. In a thermostatic circuit controller, the combination of a casing including a base plate, a setting bar vertically guided on the base plate, a thermally operated cam, a setting arm pivotally mounted at one end upon the bar, a roller carried by the arm for contacting said cam, a bracket pivotally mounted at one end on the bar and bearing upon the free end portion of the setting arm, a fluid contact tube carried by the bracket, and indicating setting means for vertically adjusting the setting bar.

12. In a thermostatic circuit controller, the combination of a casing including a base plate, a setting bar vertically guided on the base plate, a thermally operated cam arranged at one side of the bar, a setting arm pivotally mounted at one end upon the bar and having an arched rest portion overlying said cam, a roller mounted on the rest portion for contacting with the cam, a bracket pivotally mounted at one end upon the bar and bearing upon the arched rest portion of the setting arm, a mercury contact tube carried by the bracket, and setting means for vertically adjusting the bar and including a pointer for co-acting with a scale provided on the face of the casing.

13. In a thermostatic circuit controller, the combination of a casing including a base plate, a rack bar vertically guided on the base plate, a thermally operated cam journaled in the base plate at one side of the rack, a setting arm pivotally mounted at one end upon the rack bar and carrying a roller at its free end for contacting with the cam, a bracket pivotally mounted at one end on the rack bar and resting upon the free end portion of the setting arm, a mercury contact tube carried by the bracket, a shaft rotatable in the casing at one side of the rack bar, a pinion on the shaft and meshing with the teeth of the rack bar for vertical movement of the bar, an operating knob for the shaft, and a pointer carried by the shaft for movement over a scale provided on the face side of the casing.

14. In a thermostatic circuit controller, the combination of a casing including a base plate, a setting bar vertically guided on the base plate, a thermally operated cam, a bracket pivotally carried by the bar and engaging said cam, a mercury contact tube carried by the bracket, a setting shaft rotatable in the casing below the bar and provided with a crank arm, a link pivotally connected between the crank arm and setting bar for imparting vertical movement to the bar upon rotation of the setting shaft, and a pointer carried by the shaft for movement over a scale provided on the face side of the casing.

15. In a thermostatic circuit controller, the combination of a casing including a base plate and a cover, a bar vertically guided on the base plate, a thermostatic unit carried by and projecting rearwardly from the base plate and including a spindle and a thermal element for imparting rotation to the spindle, a cam fixed on the spindle within the casing, a bracket pivotally carried by the bar to be tilted by said cam, a fluid contact tube fixed on the bracket, a setting shaft rotatable in the casing, means for imparting vertical movement to the bar upon rotation of the setting shaft, and a pointer carried by the shaft for movement along a scale delineated upon the face of the cover.

DOMINIC MAZZIE.